(12) United States Patent
Heyne et al.

(10) Patent No.: US 12,162,371 B2
(45) Date of Patent: Dec. 10, 2024

(54) METHOD AND APPARATUS FOR DETERMINING A PRICE OF A CHARGING PROCESS OF A VEHICLE

(71) Applicant: Dr. Ing. h.c. F. Porsche Aktiengesellschaft, Stuttgart (DE)

(72) Inventors: Raoul Heyne, Wiernsheim (DE); Timo Massierer, Ludwigsburg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 176 days.

(21) Appl. No.: 17/400,281

(22) Filed: Aug. 12, 2021

(65) Prior Publication Data
US 2022/0048401 A1 Feb. 17, 2022

(30) Foreign Application Priority Data
Aug. 12, 2020 (DE) ..................... 10 2020 121 171.6

(51) Int. Cl.
*B60L 53/66* (2019.01)
*B60L 53/14* (2019.01)
*H02J 7/00* (2006.01)

(52) U.S. Cl.
CPC ............. *B60L 53/665* (2019.02); *B60L 53/14* (2019.02); *H02J 7/0047* (2013.01); *H02J 7/007188* (2020.01)

(58) Field of Classification Search
CPC ...... B60L 53/665; B60L 53/14; H02J 7/0047; H02J 7/007188
USPC ........................................................ 320/109
See application file for complete search history.

(56) References Cited

U.S. PATENT DOCUMENTS

| 5,562,538 | A | * | 10/1996 | Suyama | .................. | B60L 53/14 |
| | | | | | | 454/75 |
| 5,623,194 | A | * | 4/1997 | Boll | ........................ | B60L 58/12 |
| | | | | | | 320/155 |
| 9,434,268 | B2 | * | 9/2016 | DeBoer | .................. | B60L 53/60 |
| 10,081,261 | B2 | | 9/2018 | Grimes et al. | | |
| 2011/0202192 | A1 | * | 8/2011 | Kempton | .................. | H02J 3/38 |
| | | | | | | 320/109 |
| 2011/0213983 | A1 | * | 9/2011 | Staugaitis | ............... | B60L 58/40 |
| | | | | | | 713/176 |

(Continued)

FOREIGN PATENT DOCUMENTS

| DE | 10 2015 116 105 | | 4/2016 |
| KR | 20190083206 | * | 7/2019 |

OTHER PUBLICATIONS

German Search Report of Apr. 21, 2021.

*Primary Examiner* — Richard Isla
*Assistant Examiner* — Manuel Hernandez
(74) *Attorney, Agent, or Firm* — Gerald E. Hespos; Michael J Porco

(57) ABSTRACT

A method is provided for carrying out a charging process of a vehicle-external charging apparatus (1) for charging a vehicle (2), in particular an electric or hybrid vehicle. The method includes using a current measuring instrument (3) of the charging apparatus (1) to measure a charging current. The method then includes closing a first contactor (4) of the charging apparatus (1) and a second contactor (5) of the vehicle (2) for a time period that is measured by the current measuring instrument (3). A charging apparatus (1) for performing the method also is provided.

14 Claims, 2 Drawing Sheets

(56) References Cited

U.S. PATENT DOCUMENTS

| | | | |
|---|---|---|---|
| 2011/0227533 A1* | 9/2011 | Wolfien | G07F 17/24 |
| | | | 320/109 |
| 2013/0346166 A1* | 12/2013 | Chihara | B60L 53/65 |
| | | | 705/13 |
| 2013/0346308 A1 | 12/2013 | Naito et al. | |
| 2014/0266004 A1 | 9/2014 | Andrews, Jr. | |
| 2015/0115966 A1* | 4/2015 | Berman | B60L 3/003 |
| | | | 324/511 |
| 2016/0297315 A1* | 10/2016 | Gonzalez | G01R 31/3648 |
| 2018/0111495 A1 | 4/2018 | Kinomura | |
| 2018/0241228 A1* | 8/2018 | Kemppainen | H02J 13/00034 |
| 2019/0232813 A1* | 8/2019 | Kusumi | B60L 53/305 |
| 2020/0118181 A1* | 4/2020 | Lee | G06Q 30/0284 |
| 2020/0122584 A1* | 4/2020 | Zhang | B60W 10/30 |
| 2023/0147695 A1* | 5/2023 | Earl | H02J 7/0048 |
| | | | 320/109 |

* cited by examiner

| LEGEND | |
|---|---|
| 1 | Charging Apparatus |
| 2 | Vehicle |
| 3 | Current Measuring Instrument |
| 4 | First Contactor |
| 4.1 | First Positively Driven Contact |
| 4.2 | First Signal Line |
| 5 | Second Contactor |
| 5.1 | Second Positively Driven Contact |
| 6 | Evaluation Device |
| 7 | Common Housing |
| 8 | Display Device |
| 9 | Charging Cable |

METHOD AND APPARATUS FOR DETERMINING A PRICE OF A CHARGING PROCESS OF A VEHICLE

CROSS REFERENCE TO RELATED APPLICATION

This application claims priority under 35 USC 119 to German Patent Appl. No. 10 2020 121 171.6 filed on Aug. 12, 2020, the entire disclosure of which is incorporated herein by reference.

BACKGROUND

Field of the Invention. The invention relates to a method for carrying out a charging process of a vehicle-external charging apparatus for charging a vehicle, in particular an electric or hybrid vehicle, wherein a charging current is measured by a current measuring instrument of the charging apparatus.

Related Art Increasing electrification of drive units of motor vehicles has led to significant expansion of the charging infrastructure. More and more charging apparatuses, usually in the form of charging stations, are being installed in public spaces as well. The driver of an electrically operated vehicle is afforded particular convenience as a result of the possibility of charging the drive batteries of the vehicle while the driver is otherwise occupied in the vicinity of the charging apparatus, for example does some shopping or undertakes a leisure activity.

In this case, the vehicle usually is parked in front of the charging apparatus. Thus, the operator incurs costs for using the parking space in front of the charging station in addition to the costs for operating the charging apparatus. For lack of a better solution, however, the operator of the charging apparatus usually bills the driver of the vehicle being charged only for an amount for the energy drawn and includes the costs for parking in the calculation.

Popular town/city center locations often have charging apparatuses blocked by vehicles whose charging process either has already ended or is prolonged artificially. For the latter situation, the driver can set the vehicle to start the charging process and then to draw a charging current of 0 A or a few amperes for a certain time. At the end of the charging or parking process, the driver pays for the energy drawn, irrespective of how long the charging process lasted and how long the driver has blocked both the charging apparatus and the parking space in front of the charging apparatus. The driver thereby minimizes his/her costs for a parking space, but the operator of the charging apparatus misses out on earnings since the charging apparatus is not available to other customers again as rapidly as possible.

Against this background it is an object of the invention to provide a method that avoids the abovementioned disadvantages of the prior art when carrying out a charging process of a vehicle-external charging apparatus for charging a vehicle, but rather affords the possibility of more accurate billing of the charging process together with the associated parking process.

SUMMARY

A method is provided for carrying out a charging process of a vehicle-external charging apparatus for charging a vehicle, in particular an electric or hybrid vehicle. The method includes measuring a charging current by a current measuring instrument of the charging apparatus, The current measuring instrument also measures a time period in which a first contactor of the charging apparatus and a second contactor of the vehicle are closed. Using the current measuring instrument to measures both the charging current and the time period in which both contactors are closed provides an accurate statement about how much energy was transferred in how much time. A charging duration can be defined by the time period in which both contactors are closed. If both contactors are closed and the vehicle demands only 0 A for charging, then the driver can nevertheless be billed for this time. It is advantageous to have the charging current and the time period measured by the current measuring instrument since only one instrument, namely the current measuring instrument, has to be calibrated.

A contactor within the meaning of this disclosure also is known as a switching contactor and is an electrically or electromagnetically actuated switch for high electrical powers. In particular, a contactor within the meaning of this disclosure is a switch for connecting or disconnecting a charging connection between vehicle and charging apparatus.

In one embodiment, the time period is measured by an evaluation device of the current measuring instrument. As a result, it is possible to link the time period with the measured charging current and to make a corresponding calculation of the price to be paid for the charging process. The evaluation device may have a first input for receiving the measurement data with regard to the measured charging current and a second input for receiving information about the switching states of the contactors. The evaluation device may have a display device, such as an LCD display that is arranged to be visible from outside the charging apparatus.

A price for the charging process may be determined and displayed by the evaluation device on the basis of the measured charging current and the measured time period. Thus, a corresponding calculation of the price to be paid for the charging process may be carried out by linking the charging current and time period. The measured charging current and/or the amount of energy transferred to the vehicle and/or the measured time period and/or the calculated price may be displayed by the display device.

Measuring the time period that the first contactor transmits from a first positively driven auxiliary contact of the first contactor via a first sensor line to the current measuring instrument, preferably to the evaluation device, may include transmitting information about whether the first contactor is open or closed. Additionally, measuring the time period that the second contactor transmits from a second positively driven auxiliary contact of the second contactor via a second sensor line to the current measuring instrument, preferably to the evaluation device, may include transmitting information about whether the second contactor is open or closed. This advantageously enables the switching state of the contactors to be determined very securely. The second sensor line may be integrated at least partly into a charging cable for connecting the vehicle to the charging apparatus.

The method also may include measuring an electrical voltage between the vehicle and the charging station, and specifically measuring the electrical voltage between the first contactor and the second contactor. This enables a further possibility for monitoring the switching states of the contactors. If the second contactor is closed, then a voltage is present between the vehicle and the charging apparatus, and that voltage can be measured. When the first contactor is closed, a voltage is started up by the charging apparatus.

The method further may include measuring a time period in which the electrical voltage is not equal to zero volts and comparing that time period with other time periods to check the charging process for discrepancies. Such discrepancies can allow a conclusion to be drawn about defects on the charging apparatus or on the vehicle, which can thus be recognized in a simple manner.

Information about whether the second contactor is open or closed may be determined by measuring the electrical voltage with the first contactor open. As a result, the voltage present when the second contactor is closed can be utilized for interrogating the switching state of the second contactor, without the vehicle or the second contactor having to be influenced.

In one embodiment, the method may terminate the charging process after exceeding a maximum time duration of the respective method step before the first and second contactors are closed. This time-out of the preparatory method steps prevents the charging process from being delayed and thus prevents the parking time of the vehicle in front of the charging station from being extended to a period of time before the charging process. One such method step may be establishing communication between vehicle and charging apparatus. Method steps such as an insulation test or precharging are carried out with the contactors already closed, that is to say that they thus contribute to the measured time period.

A charging apparatus also is provided for carrying out the above-described method. To that end, the charging apparatus comprises a current measuring instrument having means for measuring the charging current and means for measuring the time period in which the first and second contactors are closed.

In some embodiments, the evaluation device and the current measuring instrument are arranged in a common housing. This facilitates the necessary ensuring of the correct measurement of charging current and time period by calibration and subsequent sealing of the housing.

All of the details, features and advantages disclosed above relate both to the method according to the invention and to the charging apparatus.

Further details and advantages of the invention will be explained below on the basis of the exemplary embodiment illustrated in the drawings.

DETAILED DESCRIPTION

Figure 1:
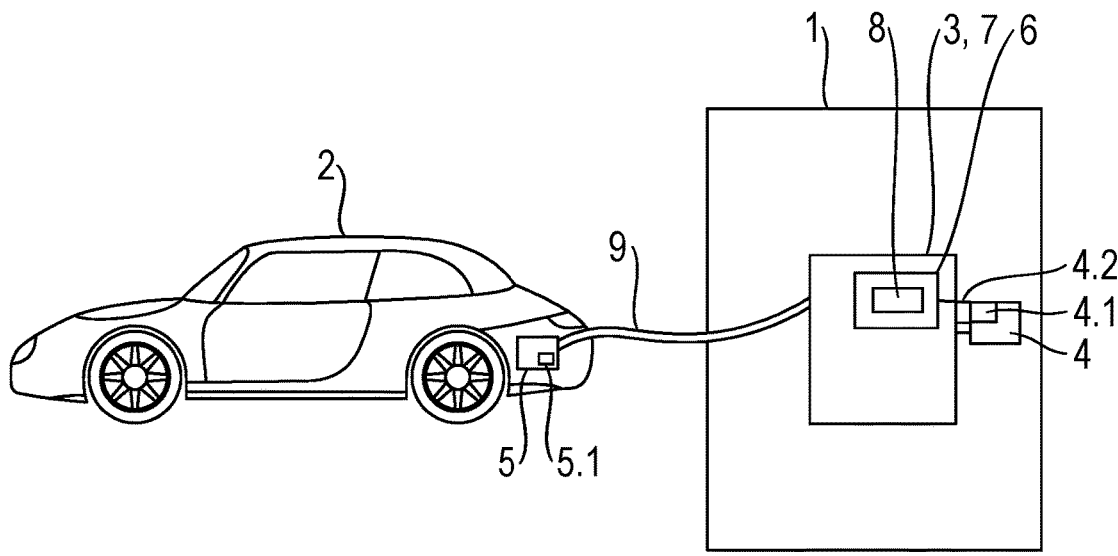
FIG. 1 schematically illustrates an embodiment of the disclosed charging apparatus that can be operated in accordance with the disclosed method.
Figure 2:
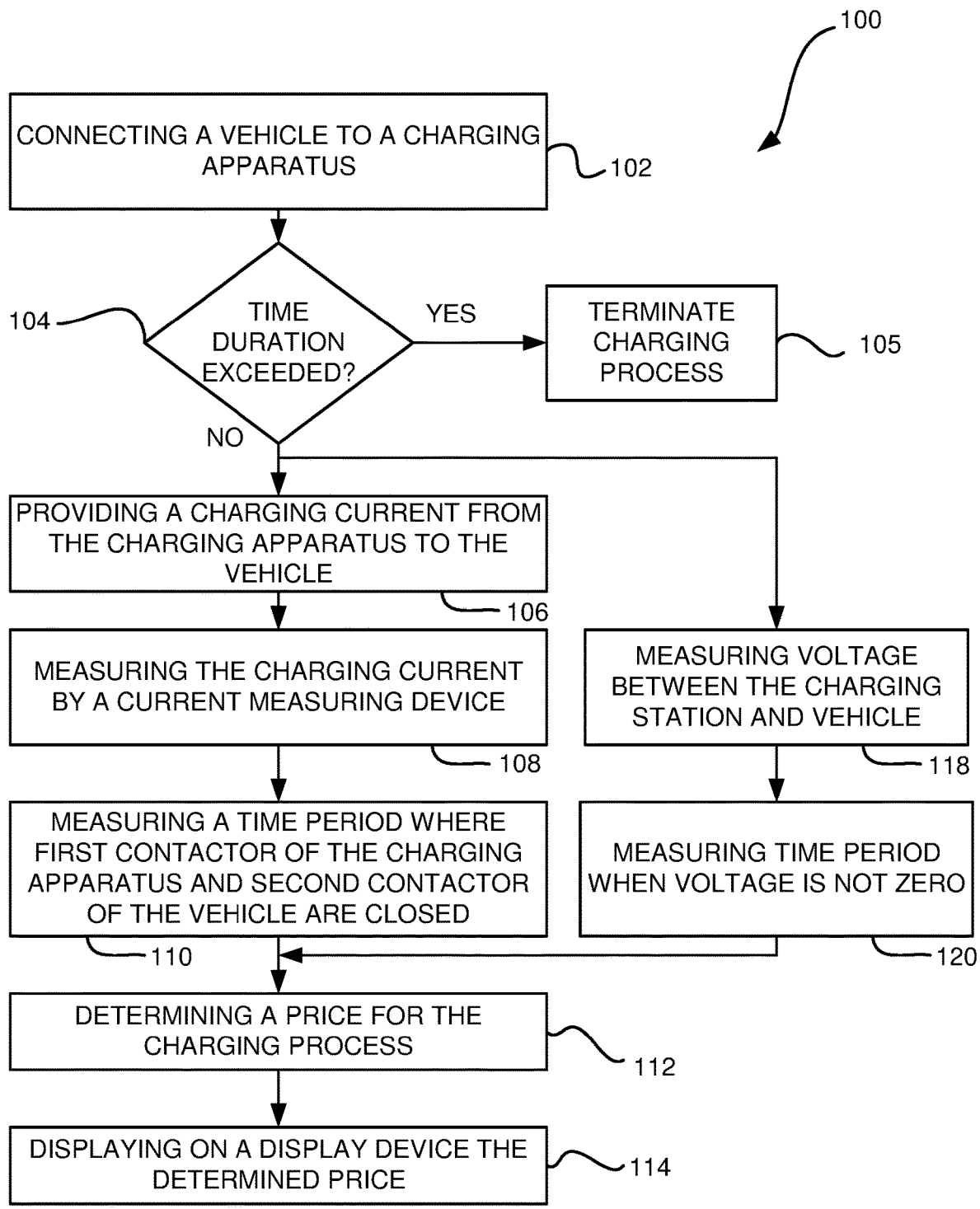
FIG. 2 is a flowchart illustrating a method of the disclosed charging apparatus.

FIG. 1 schematically illustrates a vehicle-external charging apparatus 1 for charging a vehicle 2 having an electric drive. FIG. 2 illustrates a method in accordance with the present disclosure. Such charging apparatuses 1 often are installed in publicly accessible manner parking locations. The vehicle 2 can be stopped and parked in front of the charging apparatus 1 and connected to the charging apparatus 1 by way of a charging cable 9 (102). The driver of the vehicle 2 usually is billed an amount that is dependent exclusively on the amount of energy transferred while the vehicle is parked. The costs for providing the parking space in front of the charging apparatus 1 are not determined, but rather are already settled with the amount of energy paid for. This often has the consequence that the charging process is artificially prolonged to use a parking space in a cost-effective way. This means a significant reduction of turnover for the operator of the charging apparatus 1 since the charging apparatus 1 is not available for other vehicles during this time. This problem is taken into account by the method shown here and the charging apparatus 1 shown here.

A current measuring instrument 3 of the charging apparatus 1 may be a commercially available instrument that measures the charging current that flows from the charging apparatus 1 to the vehicle 2 (106), and a price then is determined by an evaluation device 6 of the current measuring instrument 3 (108). Furthermore, a time period of the charging process is determined by the evaluation device 6. To that end, the evaluation device 6 measures the time period in which a first contactor 4 of the charging apparatus 1 and a second contactor 5 of the vehicle 2 are simultaneously closed (110).

The evaluation device 6 may comprise or communicate with a computer that may comprise one or more general-purpose processors (CPUs) or microprocessors, RISC processors, GPUs and/or DSPs. The evaluation device 6 or an associated computer has, for example, additional elements such as storage interfaces of the communication interfaces. Optionally or additionally, the terms refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

The evaluation device 6 or an associated computer may have a memory such as a hard disk (HDD) or a (nonvolatile) solid state memory, for example a ROM store or flash memory [flash EEPROM]. The memory often comprises a plurality of individual physical units or is distributed over a multiplicity of separate devices, as a result of which access thereto takes place via data communication, for example package data service.

The first contactor 4 has a first positively driven auxiliary contact 4.1 that is connected to the evaluation device 6 via a first signal line 4.2. The second contactor 5 has a second positively driven auxiliary contact 5.1 that preferably is connected to the evaluation device 6 via a second signal line. The second signal line is integrated partly in the charging cable 9 and therefore is not illustrated here.

An electrical voltage between the vehicle 2 and the charging apparatus 1 is measured and monitored by a commercially available voltage measuring apparatus (118). If one of the contactors 4, 5 is closed, then the voltage is not equal to zero volts. Consequently, with the first contactor 4 open, for example, it is possible to make a statement about the switching state of the second contactor 5, without having to rely on the second signal line and the second positively driven auxiliary contact 5.1. The method further may include measuring a time period in which the electrical voltage is not equal to zero volts and comparing that time period with other time periods to check the charging process for discrepancies (120). Such discrepancies can allow a conclusion to be drawn about defects on the charging apparatus or on the vehicle, which can thus be recognized in a simple manner.

The time period in which both contactors 4, 5 are closed defines the duration of the charging process, that is to say the charging duration. The vehicle 2 can request a charging current of zero A for artificially prolonging the charging process. However, in accordance with the disclosed process and apparatus, an amount for the use of the parking area in front of the charging apparatus 1 can be billed based on stored charging and cost data, with that amount corresponding to the prolongation of the charging duration (112). A delay before the closing the two contactors 4, 5 is prevented by virtue of all method steps that precede the closing of the contactors 4, 5 being provided with a time-out (104). In this regard, by way of example, the establishing of communication between vehicle 2 and charging apparatus 1 is terminated if the vehicle 2 does not respond within a certain time (105).

From the time period in which both contactors 4, 5 are closed and the measured charging current, the evaluation device 6 calculates an exact price for the utilization of the charging station 1. This price can be displayed by the display device 8 together with the amount of charged energy and the time period (114). The evaluation device 6 and the current measuring instrument 3 are arranged and calibrated in a common housing 7 with corresponding cost efficiencies.

What is claimed is:

1. A method for determining a price for a charging process of a vehicle-external charging apparatus for charging a vehicle, the method comprising:
    providing a charging current from the charging apparatus to the vehicle via a charging cable, the charging current being provided from a first contactor of the charging apparatus to a second contactor of the vehicle;
    measuring the charging current by a current measuring instrument of the charging apparatus;
    transmitting, via a first sensor line connecting the first contactor to the current measuring instrument, information about whether the first contactor is open or closed to the current measuring instrument:
    transmitting, via a second sensor line connecting the second contactor to the current measuring instrument, information about whether the second contactor is open or closed to the current measuring instrument, the second sensor line being at least partially integrated into the charging cable;
    measuring a time period by the current measuring instrument in which the first contactor of the charging apparatus and the second contactor of the vehicle are closed, the measured time period including a first period of time where the vehicle requests a charging current greater than zero amperes from the charging apparatus and a second period of time where the vehicle requests a charging current of zero amperes from the charging apparatus, the measured time is indicative of an amount of time of use of a parking area associated to the charging apparatus being occupied by the vehicle; and
    determining a price for the charging process, wherein the price is based on an amount for charging the vehicle determined by the measured charging current and an amount for parking of the vehicle determined by the measured time period.

2. The method of claim 1, wherein the measuring of the time period is carried out by an evaluation device of the current measuring instrument.

3. The method of claim 2, wherein the evaluation device has a display device, and the method comprises separately displaying on the display device the respective amounts for charging and for parking.

4. The method of claim 2, wherein measuring the time period comprises transmitting information about whether the first contactor is open or closed from a first positively driven auxiliary contact of the first contactor via the first sensor line to the evaluation device of the current measuring instrument, and transmitting information about whether the second contactor is open or closed from a second positively driven auxiliary contact of the second contactor via the second sensor line to the evaluation device of the current measuring instrument.

5. The method of claim 1, further comprising measuring an electrical voltage between the vehicle and the charging apparatus.

6. The method of claim 5, wherein the measuring an electrical voltage between the vehicle and the charging apparatus comprises measuring the electrical voltage between the first contactor and the second contactor.

7. The method of claim 6, further comprising measuring a time period in which the electrical voltage is not equal to zero volts and comparing the time period in which the electrical voltage is not equal to zero volts to the time period in which a first contactor of the charging apparatus and a second contactor of the vehicle are closed.

8. The method of claim 6, wherein information about whether the second contactor is open or closed is determined by measuring electrical voltage with the first contactor open.

9. The method of claim 1, further comprising terminating the charging process after exceeding of a maximum time duration before the first and second contactors are closed.

10. A charging apparatus for charging a vehicle, the charging apparatus comprising:
    a charging cable for providing a charging current to the vehicle;
    a current measuring instrument for measuring the charging current, the charging current being provided from a first contactor of the charging apparatus to a second contactor of the vehicle;
    a first sensor line connecting the first contactor to the current measuring instrument that transmits information about whether the first contactor is open or closed to the current measuring instrument;
    a second sensor line connecting the second contactor to the current measuring instrument that transmits information about whether the second contactor is open or closed to the current measuring instrument, the second sensor line being at least partially integrated into the charging cable;
    the current measuring instrument measures a time period in which the first contactor of the charging apparatus and the second contactor of the vehicle are closed, the measured time period including a first period of time where the vehicle requests a charging current greater than zero amperes from the charging apparatus and a second period of time where the vehicle requests a charging current of zero amperes from the charging apparatus, the measured time is indicative of an amount of time of use of a parking area associated to the charging apparatus being occupied by the vehicle; and
    an evaluation device for determining a price for charging the vehicle, wherein the price is based on an amount for charging the vehicle determined by the measured charging current and an amount for parking of the vehicle determined by the measured time period.

11. The charging apparatus of claim 10, wherein the current measuring instrument comprises the evaluation device for measuring the time period.

12. The charging apparatus of claim 11, wherein the evaluation device has a display device that separately displays the respective amounts for charging and for parking.

13. The charging apparatus of claim 11, further comprising a voltmeter for measuring an electrical voltage between the vehicle and the charging apparatus.

14. The charging apparatus of claim 11, wherein the evaluation device and the current measuring instrument are arranged in a common housing.

\* \* \* \* \*